(12) United States Patent
Jeong et al.

(10) Patent No.: US 10,996,150 B2
(45) Date of Patent: May 4, 2021

(54) JIG ASSEMBLY COMPRISING BENDING JIG AND APPARATUS AND METHOD FOR MEASURING BENDING TENSILE STRENGTH USING THE SAME

(71) Applicant: LG CHEM, LTD., Seoul (KR)

(72) Inventors: An-Soo Jeong, Daejeon (KR); Young-Tae Kim, Daejeon (KR); Nam-Won Kim, Daejeon (KR); Min-Gyu Kim, Daejeon (KR); Pil-Kyu Park, Daejeon (KR); Han-Gab Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 181 days.

(21) Appl. No.: 16/342,860

(22) PCT Filed: Jun. 27, 2018

(86) PCT No.: PCT/KR2018/007302
§ 371 (c)(1),
(2) Date: Apr. 17, 2019

(87) PCT Pub. No.: WO2019/004728
PCT Pub. Date: Jan. 3, 2019

(65) Prior Publication Data
US 2019/0265135 A1 Aug. 29, 2019

(30) Foreign Application Priority Data

Jun. 29, 2017 (KR) .................. 10-2017-0082738
Jun. 19, 2018 (KR) .................. 10-2018-0070300

(51) Int. Cl.
*G01N 3/08* (2006.01)
*G01N 3/04* (2006.01)
(Continued)

(52) U.S. Cl.
CPC ................ *G01N 3/04* (2013.01); *G01N 3/02* (2013.01); *G01N 3/08* (2013.01); *G01N 3/20* (2013.01);
(Continued)

(58) Field of Classification Search
CPC .. G01N 3/04; G01N 3/02; G01N 3/08; G01N 3/20; G01N 2203/0017; G01N 2203/0282; H01M 10/00
(Continued)

(56) References Cited

U.S. PATENT DOCUMENTS 4,233,849 A * 11/1980 Defebvre ............. G01N 29/041
73/579
2007/0186602 A1* 8/2007 Celia .................... B21D 5/0209
72/31.1
(Continued)

FOREIGN PATENT DOCUMENTS

CN 102804455 A 11/2012
JP 3-142340 A 6/1991
(Continued)

OTHER PUBLICATIONS

International Search Report issued in PCT/KR2018/007302 (PCT/ISA/210), dated Sep. 28, 2018.
(Continued)

*Primary Examiner* — Max H Noori
(74) *Attorney, Agent, or Firm* — Birch, Stewart, Kolasch & Birch, LLP

(57) ABSTRACT

A jig assembly for measuring the tensile strength of an electrode at a bend having a similar radius to a core, an apparatus for measuring bending tensile strength including the jig assembly, and a method for measuring bending tensile strength that measures the tensile strength of an electrode at a bend having a similar radius to a core using the
(Continued)

apparatus for measuring bending tensile strength are provided. The jig assembly of the present disclosure includes a fixing unit configured to fix a first end part of a sample, and a plate shaped bending jig configured to provide a one point bend to a lengthwise direction cross section of the sample and to guide a second end part of the sample toward a tensile testing load unit. According to the present disclosure, it is possible to measure the tensile strength of the electrode under a similar condition to a winding process before the electrode is used in real winding applications.

15 Claims, 13 Drawing Sheets

(51) Int. Cl.
*G01N 3/02* (2006.01)
*G01N 3/20* (2006.01)
*H01M 10/00* (2006.01)

(52) U.S. Cl.
CPC .... *H01M 10/00* (2013.01); *G01N 2203/0017* (2013.01); *G01N 2203/0282* (2013.01)

(58) Field of Classification Search
USPC .......................................................... 73/856
See application file for complete search history.

(56) References Cited

U.S. PATENT DOCUMENTS

| | | | |
|---|---|---|---|
| 2012/0247222 A1* | 10/2012 | Golovashchenko | G01N 3/20 73/849 |
| 2012/0308863 A1 | 12/2012 | Masumoto et al. | |
| 2015/0033870 A1 | 2/2015 | Lee et al. | |
| 2016/0033379 A1* | 2/2016 | Heiss-Chouquet | G01N 3/08 73/834 |
| 2020/0225134 A1* | 7/2020 | Jeong | G01N 3/20 |
| 2020/0292429 A1* | 9/2020 | Fujii | G06F 30/23 |

FOREIGN PATENT DOCUMENTS

| | | |
|---|---|---|
| JP | 2003-307477 A | 10/2003 |
| JP | 2004-330282 A | 11/2004 |
| JP | 2005-69696 A | 3/2005 |
| JP | 2007-78606 A | 3/2007 |
| JP | 4168496 B2 | 10/2008 |
| JP | 2009-63499 A | 3/2009 |
| KR | 9-184794 A | 7/1997 |
| KR | 20-1998-016696 U | 6/1998 |
| KR | 10-1999-0038268 A | 6/1999 |
| KR | 10-2010-0122636 A | 11/2010 |
| KR | 10-2014-0036863 A | 3/2014 |
| KR | 10-2015-0016013 A | 2/2015 |
| KR | 10-2016-0006851 A | 1/2016 |

OTHER PUBLICATIONS

Druker, A., et al, "A manufacturing process for shaft and pipe couplings of Fe—Mn—Si—Ni—Cr shape memory alloys," Materials and Design, 2014, vol. 56, pp. 878-888.

European Search Report and Opinion for Appl. No. 18 82 3769.7 dated Aug. 16, 2019.

Katsumata, M., et al, "EMI application of highly conductive plastic composite using vapor-grown carbon fibers (VGCF)," Visual Communications and Image Processing, Jul. 23, 1993, vol. 1916, pp. 140-148.

Wan, L., et al, "Fabrication and interfacial characterization of aluminum foam sandwich via fluxless soldering with surface abrasion," Composite Structures, Jan. 6, 2015, vol. 123, pp. 366-373.

* cited by examiner

JIG ASSEMBLY COMPRISING BENDING JIG AND APPARATUS AND METHOD FOR MEASURING BENDING TENSILE STRENGTH USING THE SAME

TECHNICAL FIELD

The present disclosure relates to an apparatus and method for measuring tensile strength, and more particularly, to a jig assembly necessary to measure the bending tensile strength as a new parameter for evaluating an electrode for a secondary battery, an apparatus for measuring bending tensile strength including the same and a method for measuring bending tensile strength using the same. The present application claims priority to Korean Patent Application No. 10-2017-0082738 filed in the Republic of Korea on Jun. 29, 2017 and Korean Patent Application No. 10-2018-0070300 filed in the Republic of Korea on Jun. 19, 2018, the disclosures of which are incorporated herein by reference.

BACKGROUND ART

In general, a secondary battery may be classified into a can type in which an electrode assembly is embedded in a cylindrical or prismatic metal can, and a pouch type in which an electrode assembly is embedded in a pouch-type case of an aluminum laminate sheet, and this conventional secondary battery uses a sheet-type electrode. Among them, for example, a secondary battery including a winding-type electrode assembly is manufactured by receiving a wound electrode assembly with a separator interposed between a sheet-type positive electrode and a sheet-type negative electrode in a battery case and injecting an electrolyte solution.

FIG. 1 is a vertical cross-sectional view of a general cylindrical secondary battery, showing the main structure of the general cylindrical secondary battery.

Referring to FIG. 1, the cylindrical secondary battery 1 includes a cylindrical battery case 10, a cap assembly 20 that is hermetically connected on top of the battery case, and a winding-type electrode assembly 30 that is received in the battery case 10 with an electrolyte solution. The electrode assembly 30 is formed by placing a positive electrode 31 and a negative electrode 33 with a separator 32 interposed between and rolling them into round shape.

The positive electrode 31 is formed by coating a positive electrode active material including lithium cobalt composite oxide or lithium manganese composite oxide in layers on the surface of a positive electrode current collector sheet of a metal foil, for example, an aluminum foil or a stainless steel foil, followed by compression. The negative electrode 33 is formed by coating a negative electrode active material including graphite or cokes in layers on the surface of a negative electrode current collector sheet of a metal foil, for example, a copper foil or a stainless steel foil, followed by compression. A portion of the positive electrode 31 has an uncoated region in which the positive electrode active material is not formed, and a positive electrode tab 40 is connected to the uncoated region. A portion of the negative electrode 33 has also an uncoated region in which the negative electrode active material is not formed, and a negative electrode tab 50 is connected to the uncoated region. The positive electrode tab 40 and the negative electrode tab 50 are respectively welded to the cap assembly 20 and the battery case 10.

FIG. 2 is a diagram illustrating a method for manufacturing a winding-type electrode assembly. As shown in FIG. 2, the electrode assembly 30 is manufactured by winding a laminate sheet 35 on a core 60 that rotates by a winding machine, in which the laminate sheet 35 includes a sheet-type positive electrode and a sheet-type negative electrode and a separator interposed between.

However, the electrode assembly 30 manufactured in this way has a small winding radius, especially, around the core 60, so there is a risk that a crack may occur in the positive electrode 31 and the negative electrode 33. Here, the crack includes a crack in the active material layer, a crack in the current collector sheet and even the resulting disconnection (including partial disconnection) of the electrode. Among them, disconnection is fatal to the battery performance and its management is important. Accordingly, it is necessary to determine the winding radius, in particular, the radius R of the core 60 without cracking and with no unnecessary increase in battery volume, and accordingly, it is also necessary to determine the winding tension.

Accordingly, it is important to determine the accurate winding radius and winding tension, but there is no way to identify whether the winding radius and the winding tension were suitable or not from the electrode assembly after winding. It is because once the wound electrode assembly is dissembled, a crack occurs during dissembling, and it is difficult to distinguish such a crack from a crack occurred during winding.

Accordingly, before winding the electrode assembly, it is necessary to identify the tensile strength of each electrode, in particular, the tensile strength at a bend having a similar radius to the core, and determine the suitable winding radius and winding tension. However, there was no attempt to measure the tensile strength while bending the electrode, and there was no suitable measuring apparatus or method.

The electrode to be evaluated in the present disclosure has an active material layer coated on a current collector. The conventional method for evaluating the state of the coating layer includes a pencil hardness tester, a nanoindenter and Dynamic Mechanical Analysis (DMA), and their application for electrode evaluation may be considered.

However, a pencil hardness tester has a big error even in tests using a same coating layer because the pencil angle and pencil surface settings are determined by a measurer. A nanoindenter measures the hardness or the modulus of elasticity by indenting a coating layer using a nanotip, and thus when the nanotip is disposed at concave and convex portions of the coating layer surface, the results are contrary, resulting in a big error. In the case of DMA that measures the modulus of elasticity by holding the two ends of a coating layer and moving up and down, the modulus of elasticity does not represent the properties of the entire structure including the coating layer and even an under layer, there is a big difference in the result value depending on the thickness, it takes much time to measure, there is a big error even in the same sample, making it difficult to enable specification, and the high price of the apparatus itself makes it difficult to use in a real process.

Most of all, there is a limitation because it is difficult to obtain the results representing the properties of the electrode as a whole including not only the active material layer but also the current collector even though a test is performed on the active material layer using conventional pencil hardness tester, nanoindenter and DMA.

DISCLOSURE

Technical Problem

An object of the present disclosure is to provide a jig assembly for measuring the tensile strength of an electrode at a bend having a similar radius to a core.

Another object of the present disclosure is to provide an apparatus for measuring bending tensile strength including the jig assembly.

Still another object of the present disclosure is to provide a method for measuring bending tensile strength to measure the tensile strength of an electrode at a bend having a similar radius to a core using the apparatus for measuring bending tensile strength.

Technical Solution

To solve the above-described problem, a jig assembly of the present disclosure includes a fixing unit configured to fix a first end part of a sample, and a plate shaped bending jig configured to provide a one point bend on a lengthwise direction cross section of the sample and guides to guide a the other end part of the sample toward a tensile testing load unit.

One point on the lengthwise direction cross section of the sample may represent that because of the shape of a line along the widthwise direction perpendicular to the lengthwise direction, the bending jig according to the present disclosure causes a bend on the basis of the line along the widthwise direction of the sample.

The bending jig may have a flat rectangular parallelepiped shape having a bottom face and a front end part in a shape of a semi-sphere or a semi-polygonal prism, bottom face and the front end part may be configured to provide the one point bend.

Preferably, the front part has a predetermined radius or cross section.

In this instance, the cross section of the front end part may have a semi-circular shape with the radius of 0.25 to 0.5 mm.

The jig assembly according to the present disclosure may further include a support configured to fix the bending jig at two ends of the bending jig, and the fixing unit may include a base configured to support the first end part of the sample such that the first end part of the sample is disposed higher than the bottom face of the bending jig, and a fixing plate configured to fix the first end part of the sample to the base.

Here, the bending jig may be located relative to the base such that an angle between the sample extending from the base to the bending jig may be from 0 to 10°.

The jig assembly may further include a sample location center setting jig which is disposed in the fixing plate to set a center location of the sample.

The jig assembly may further include a bottom plate coupled to the support and the base. The support may include a block installed at the bottom plate, a jig fixing block installed at the block and having a slot into which the bending jig is inserted on an upper surface of the jig fixing block, and a wing bolt to fix the bending jig mounted in the jig fixing block.

The base and support may be provided on opposite ends of the bottom plate, and the base may include a vertical fixing block standing upright from the bottom plate, and a horizontal fixing block connected and fixed to the vertical fixing block at a right angle to extend toward the bending jig such that the first end part of the sample may be placed on the horizontal fixing block.

The fixing plate may include a clamp block configured to directly press the first end part of the sample against the base, and a toggle clamp configured to apply a force to the clamp block.

Additionally, the jig assembly may further include a screw configured to move the clamp block towards the base to press the first end part of the sample so that the first end part of the sample is fixable between the base and the clamp block to prevent the first end part of the sample from moving.

To solve another problem, an apparatus for measuring bending tensile strength according to the present disclosure includes the jig assembly according to the present disclosure, and a tensile strength measuring device configured to be connectable to the second end part of the sample such that the second end part of the sample passes around the bottom face of the bending jig of the jig assembly, the tensile strength measuring device includes a tensile testing load unit arranged in a vertical direction, in order to measure a tensile strength while bending the sample.

The tensile testing load unit of the tensile strength measuring device may have a table, a lower crosshead, and an upper crosshead above a bed, the table may be movable up and down by a hydraulic cylinder, the lower crosshead may be moveable up and down along a vertical screw bar that is operated by a motor, and the upper crosshead may movable up and down with the movement of the table, and the jig assembly may be installed between the lower crosshead and the upper crosshead or between the table and the lower crosshead.

To solve still another problem, a method for measuring bending tensile strength using the apparatus for measuring bending tensile strength according to the present disclosure includes fixing a first end part of a sample using the fixing unit of the jig assembly, placing the sample under the bending jig and bending up the sample while being wound on the bending jig, connecting a second end part of the sample to the tensile strength measuring device, and applying a force to the second end part of the sample and calculating the tensile strength from a force at a point in time when the sample is broken.

Advantageous Effects

According to the present disclosure, it is possible to measure the tensile strength of an electrode under a similar condition to a winding process before the electrode is used in real winding applications.

Additionally, it is possible to identify the point in time when a crack occurs according to the bending level, and accordingly enable specification of the electrode properties.

Accordingly, it is possible to reduce the occurrence of cracks, as well as helping to determine the winding radius and the winding tension to prevent any unnecessary volume increase and allow lithium ions to smoothly move, and ultimately, to provide a winding-type lithium secondary battery having good performance.

As compared to the conventional method such as a pencil hardness tester, a nanoindenter and DMA, the jig assembly of the present disclosure and the apparatus for measuring bending tensile strength including the same ensures accuracy, requires a short time to measure, enables specification easily, operates at low costs, and can measure the bending tensile strength representing the properties of the electrode.

BRIEF DESCRIPTION OF THE DRAWINGS

The accompanying drawings illustrate preferred embodiments of the present disclosure, and together with the following detailed description, serve to provide further understanding of the technical aspects of the present disclosure, and thus, the present disclosure should not be construed as being limited to the drawings.

MODE FOR CARRYING OUT THE INVENTION

Figure 1:
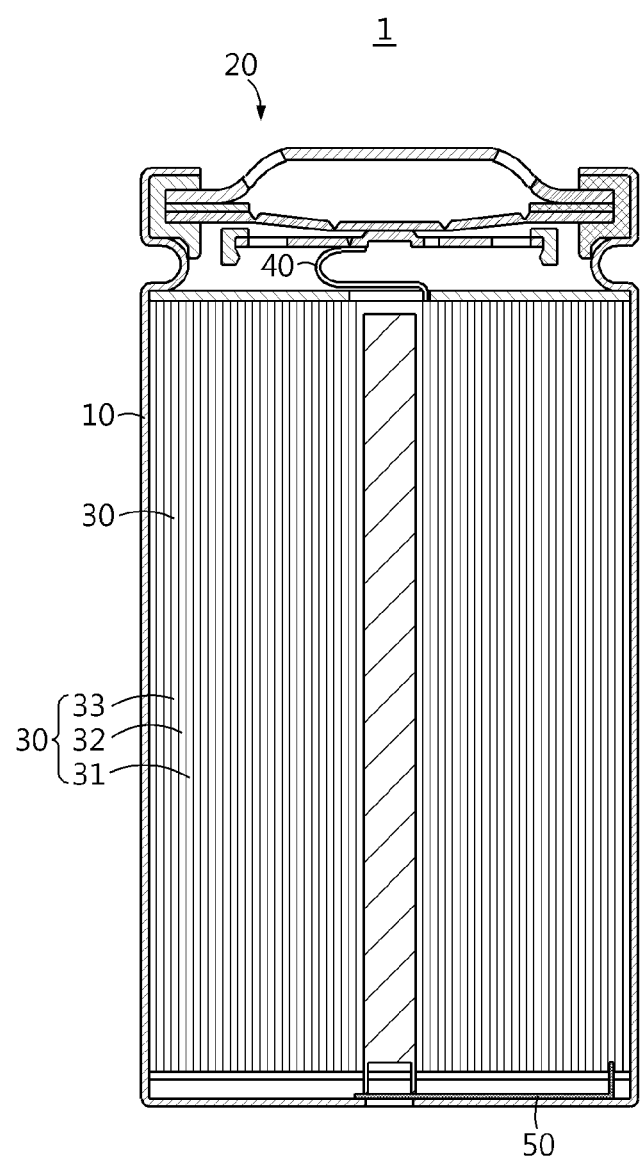
FIG. 1 is a vertical cross-sectional view of a general cylindrical secondary battery.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

An electrode that can be applied to a jig assembly of the present disclosure, a measuring apparatus including the same and a measuring method using the same may be a negative electrode or a positive electrode, and is not limited to a particular type. However, the electrode has a big change in the state of an active material layer depending on the storage condition, and thus the cracking aspects also change. Accordingly, for accurate measurements, it is desirable to perform measurements using an electrode stored in a constant condition. For example, it is desirable to measure the tensile strength within 1 day (24 hours) after coating an electrode active material paste on a current collector, drying and press-rolling. Additionally, it is desirable to store the electrode at the relative humidity of 0 to 10% and room temperature (25° C.) until the electrode is measured.

In the specification, the 'sample' refers to a target for tensile strength measurement after bending using the jig assembly of the present disclosure, and for example, may be an electrode sample.

In general, in measuring the mechanical properties of a material, the tensile strength, the bending strength (flexural strength) and the compression strength are known.

In the tensile testing of a material, a value obtained by dividing the maximum tensile load until a sample is broken by the cross section (or the length) of the sample before the test is the tensile strength.

When bending the material by a load, the bend increases with the load, and a value obtained by dividing the stress when the material is broken at the end by the cross section is the bending strength. This value can be obtained from brittle materials such as ceramics. However, when breakage does not occur despite attempts to bend a metal material having rich ductile and malleable properties such as the electrode current collector, it is impossible to determine the value of bending strength.

In the compression test of a brittle material, crack breakage describing vertical cracking, grain breakage describing breakage into grains, or shear breakage describing oblique cracking occurs. In the event of compressive breakage, a value obtained by dividing the vertical stress in cross section, i.e., the compression load at that time by the cross section of the sample is the compression strength. It cannot be calculated from a metal material having rich ductile and malleable properties such as the electrode current collector.

In measuring the mechanical properties of the electrode including the electrode current collector, the present disclosure decided to measure the tensile strength under this consideration. Additionally, to simulate a winding situation, the present disclosure measures the tensile strength while bending the electrode around a similar radius to the core radius. Consideration was taken into account that when an excessive force is applied to the active material layer coated on the electrode current collector and the electrode current collector during winding, a crack may occur, and this may affect the tensile strength of the electrode. Accordingly, the present disclosure measures the tensile strength after creating a situation in which a crack may occur by bending the electrode, and because the tensile strength is measured when the electrode is bent, introduction of a new parameter 'bending tensile strength' to electrode property evaluation has significance.

Accordingly, the present disclosure proposes a new apparatus and method that is completely different from the conventional apparatus and method for simply measuring the tensile strength and the conventional apparatus and method for simply measuring the bending strength, and is not their combination. Due to the characteristics of the material, by the above-mentioned reason, it is not meaningful to measure the bending strength of the electrode including the electrode current collector, and thus it is not possible to combine bending strength measurement with tensile strength measurement. It should be noted that the present disclosure is not such a combination.

Meanwhile, in evaluating an organic coating layer, a mandrel bend tester is known, and the mandrel bend tester is used to observe how much the coating layer is broken with a naked eye after putting a sample in a cylindrical mandrel and bending the sample. The mandrel bend tester is not used to evaluate the active material layer of the electrode targeted in the present disclosure. Additionally, the present disclosure does not simply observe how much the coating layer is broken, and it is designed to measure the tensile strength while bending the electrode having the active material layer as if it is placed in a real winding situation, and is thus completely different from a mandrel bend tester.

As noted in the conventional art, the conventional method for evaluating the state of the coating layer includes a pencil hardness tester, a nanoindenter and DMA. However, because the electrode to be evaluated by the present disclosure includes the active material layer on the current collector, even though a test is performed on the active material layer using the conventional method such as a pencil hardness tester, a nanoindenter and DMA, the results do not represent the electrode properties. The jig assembly of the present disclosure and the apparatus for measuring bending tensile strength including the same ensures accuracy, requires a short time to measure, enables specification easily, operates at low costs, and can measure the bending tensile strength representing the properties of the electrode.

Figure 3:
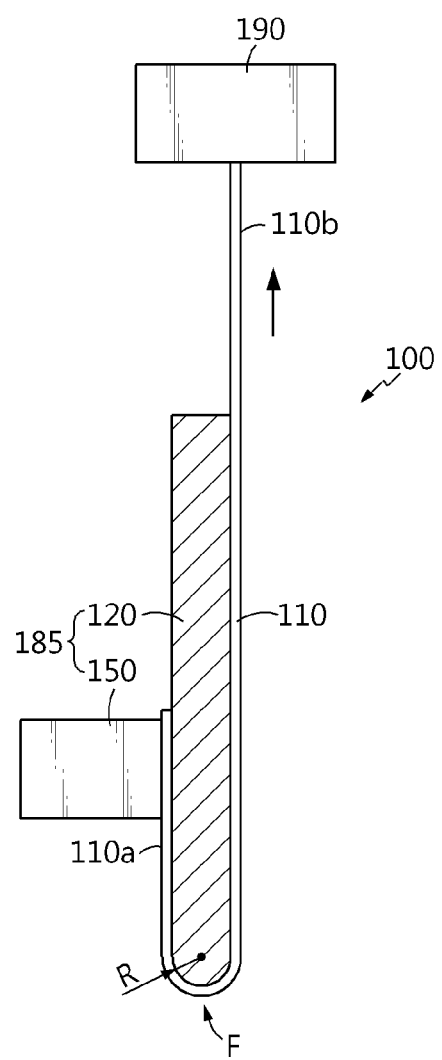
FIG. 3 is a schematic diagram of a jig assembly according to an embodiment of the present disclosure and an apparatus for measuring bending tensile strength including the same.
Figure 4:
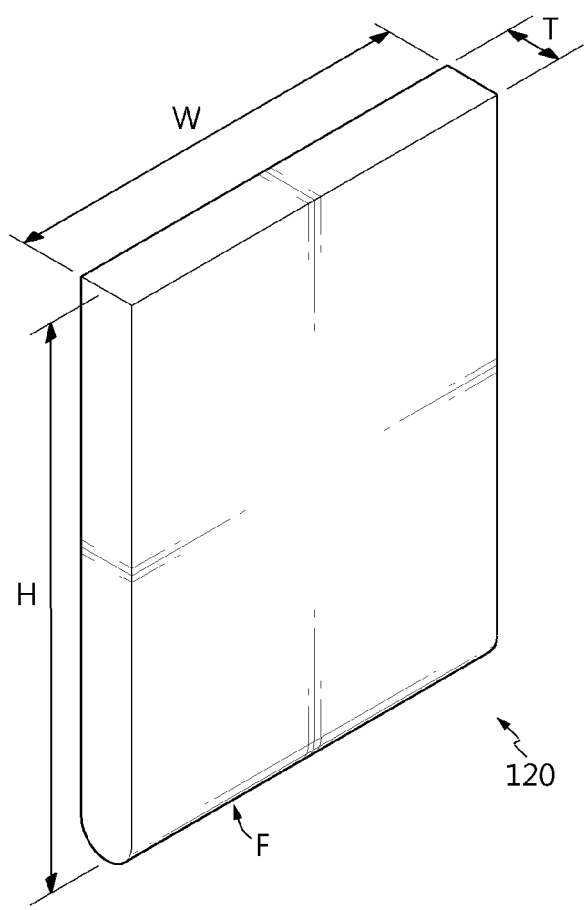
FIG. 4 is a perspective view of a bending jig that may be included in the jig assembly of FIG. 3.
Figure 5:
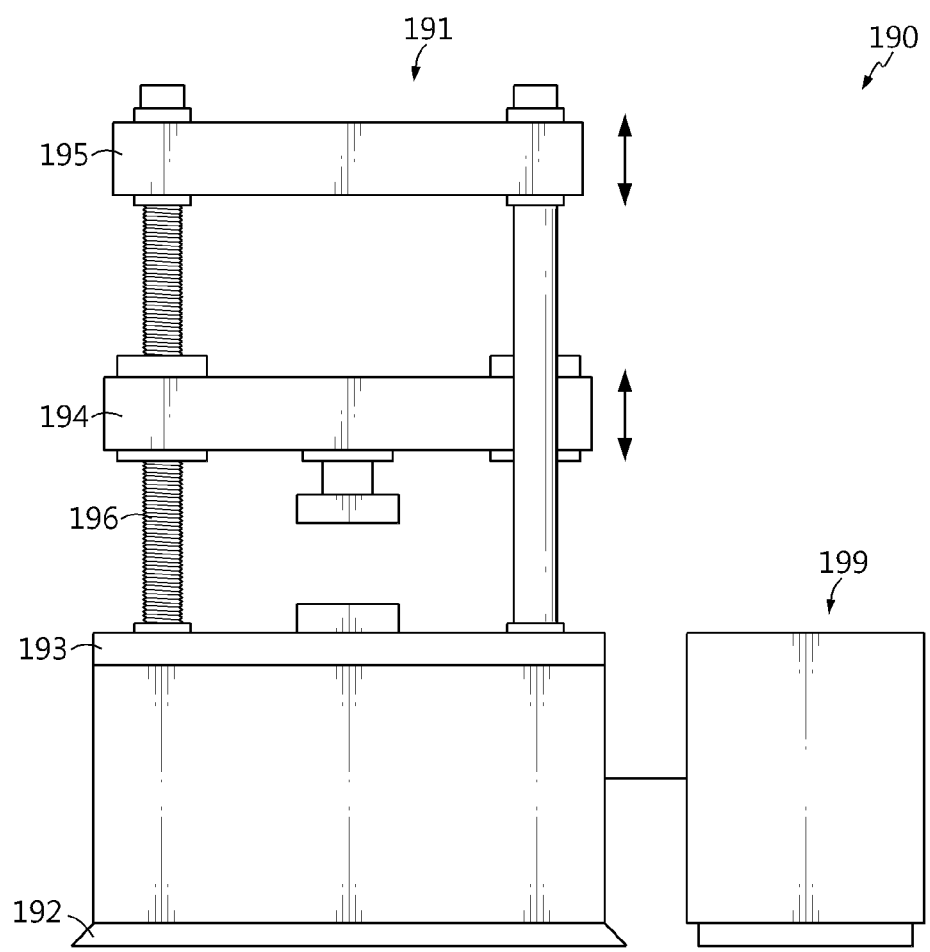
FIG. 5 is a schematic diagram of a tensile strength measuring device that may be included in the measuring apparatus of FIG. 3.

FIG. 3 is a schematic diagram of the jig assembly according to an embodiment of the present disclosure and the apparatus for measuring bending tensile strength including the same. FIG. 4 is a perspective view of the bending jig that may be included in the jig assembly of FIG. 3. FIG. 5 is a schematic diagram of the tensile strength measuring device that may be included in the measuring apparatus of FIG. 3.

The jig assembly according to an embodiment of the present disclosure, the apparatus for measuring bending tensile strength including the same, and the method for measuring bending tensile strength of an electrode using the same will be described with reference to FIGS. 3 to 5.

Referring to FIG. 3 first, the apparatus 100 for measuring bending tensile strength includes a jig assembly 185 basically including a bending jig 120 and a fixing unit 150. In addition to the jig assembly 185, the apparatus 100 for measuring bending tensile strength further includes a tensile strength measuring device 190.

A sample 110 has one end part 110a that is fixed by the fixing unit 150. The fixing method is not particularly limited, and includes, for example, taping, adhesives, welding and screws. The bending jig 120 causes the sample 110 to bend between one end part 110a and the other end part 110b of the sample 110. Additionally, the bending jig 120 guides the other end part 110b of the sample 110 to a tensile testing load unit. The other end part 110b of the sample 110 is connected to the tensile strength measuring device 190 that is suitable to provide the tensile testing load unit, and is subjected to a force pulled in the direction of the arrow shown in FIG. 3.

Figure 2:
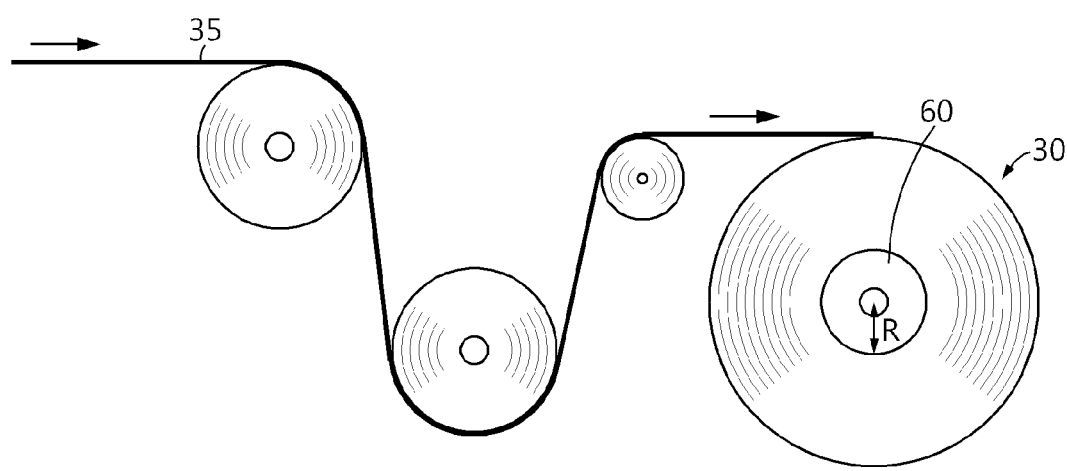
FIG. 2 is a diagram illustrating a method for manufacturing a winding-type electrode assembly.

The bending jig 120 is a member for causing one point bend on the lengthwise cross section of the sample 110 having one fixed end part 110a, and for example, simulates a winding situation in which a sheet-type electrode is wound on the core (see 60 in FIG. 2) to manufacture a winding-type electrode assembly.

This embodiment takes an example in which the bending jig 120 has a flat rectangular parallelpiped shape, with a long and narrow side forming the bottom face. The bottom face is a surface placed in a direction opposite to a direction in which the tensile strength measuring device 190 pulls the sample 110, and refers to a part that directly causes a bend to the sample 110. The bending jig 120 is not limited to a particular shape, but when the bending jig 120 is manufactured in the shape of a rod like a cylindrical mandrel, it may be bent when measuring the tensile strength due to low strength, and to ensure a predetermined strength, it is desirable to manufacture the bending jig 120 in the shape of a plate having a predetermined thickness T as shown in FIG. 4. The shape of a plate is suitable to attach the sample 110 to the plate and move the other end part 110b of the sample 110 to the tensile testing load unit, and thus, is more suitable to guide the other end part 110b of the sample 110 than the shape of a rod.

For example, the bending jig 120 may have the shape of a plate having the thickness T that is smaller than the width W and the length H. It is desirable to prepare the bending jig 120 having the width W that is larger than the width of the sample 110. Accordingly, the sample 110 is supported over the entire width, and is uniformly bent along the width of the sample 110 and is subjected to a force. The bending jig 120 may have, for example, the thickness T ranging from 0.5 mm to 1.0 mm.

The bending jig 120 is disposed with the long and narrow side facing down, and the long and narrow side of the bending jig 120, i.e., the front end part F of the bottom face causing a bend to the sample 110 may have the shape of a semi-sphere or semi-polygonal prism. Accordingly, the front end part F may be semi-circular or semi-polygonal in the lengthwise H direction cross section of the bending jig 120. When the front end part F is formed as a plane, the bottom face of the bending jig 120 that meets the sides of the bending jig 120 is formed in the shape of the edges of a rectangle, and in this case, an unnecessary force is applied to the sample 110 due to the edges of the rectangle, making it difficult to accurately measure the tensile strength. Accordingly, the front end part F of the bottom face of the bending jig 120 will be preferably in the shape of a semi-sphere that has no angular portion and can implement the closest shape to the core, and so long as there is no negative influence on the measurement accuracy, it may be formed in the shape of a semi-polygonal prism by chamfering the semi-sphere at many angles.

When the cross section of the front end part F of the bottom face of the bending jig 120 is semi-circular or semi-polygonal, the radius or size (the longest length from the center of the semi-circle or semi-polygon to the outer periphery of the semi-circle or semi-polygon) is preferably manufactured with a similar dimension to the core for manufacturing a target electrode assembly. Most preferably, it is manufactured with the same dimension. For example, this embodiment shows the case in which the cross section of the front end part F of the bottom face of the bending jig 120 is semi-circular with the same radius as the core radius R.

The radius or size of the cross section of the front end part F may be differently adjusted depending on the thickness and the active material type of the target sample, but may generally range from 0.25 mm to 0.5 mm. When indicated on the basis of diameter, the range may be between 0.5 mm and 1.0 mm. When measuring the tensile strength while bending the sample 110 using the bending jig 120, the tensile strength can be properly measured with minimized noise in the measured value. When the radius or size of the cross section of the front end part F is smaller than 0.25 mm, damage incurred to the electrode is large and accuracy of the measured value is low, and when the radius or size of the cross section of the front end part F is larger than 0.5 mm, the electrode is less likely to break, making it difficult to measure the tensile strength.

The bending jig 120 is not limited to a particular material and includes any material that meets the objective of the present disclosure, but when considering the hardness of the electrode to be measured, anodizing aluminum is desirable. Additionally, because it has strong toughness and high wear resistance and is lightweight and resistant to oxidation, anodizing aluminum is desirable for the durable use of the jig assembly 185.

As proposed by the present disclosure, to measure the tensile strength while bending the sample 110, one end part 110a of the sample 110 may be fixed using the fixing unit 150 of the jig assembly 185, the sample 110 may be allowed to pass below the front end part F of the bending jig 120 of the jig assembly 185, the other end part 110b of the sample 110 may be connected to the tensile strength measuring device 190, and then the sample 110 may be slowly pulled. The sample 110 is bent by the front end part F by tension applied to the sample 110, and then the sample 110 is continuously pulled in contact with one surface of the bending jig 120. The tensile strength is calculated from the force when the sample 110 is broken.

Instead, the sample 110 may be bent with one end part 110a fixed through the fixing unit 150 and the remaining part in contact with the front end part F of the bottom face of the bending jig 120, and then disposed in contact with one surface of the bending jig 120, and the other end part 110b of the sample 110 may be connected to the tensile strength measuring device 190. Subsequently, a force is applied to the sample 110 using the tensile strength measuring device 190 until the point in time when the sample 110 is broken, and the tensile strength is calculated from the force at the point in time when the sample 110 is broken. It is tensile testing after a sort of wind bending.

The tensile strength measuring device 190 is connected to the other end part 110b of the sample 110 set to pass through the bottom face of the bending jig 120 of the jig assembly 185 to provide the tensile testing load unit in vertical direction. To this end, the tensile strength measuring device 190 may be, for example, a tension annealing (TA) device or a universal material tester, also known as Universal Testing Machine (UTM).

Among these, UTM is a universal device widely used to measure the mechanical properties and a typical one is INSTRON UTM. The UTM may perform tests for each size while replacing sample fixing grips depending on the tests. The UTM can test various properties of the sample, and measure various properties, for example, various data including the tensile strength, bending strength and compression strength as well as peel strength, COF (static coefficient of friction, dynamic coefficient of friction), IFD, ILD (hardness test) and W bend.

The tensile strength measuring device 190 shown in FIG. 5 is a sort of UTM device. The tensile strength measuring device 190 is a hydraulic UTM that can apply a test load to the sample. The hydraulic UTM may be an analog indicator type that indicates a measured value of load applied to the sample or a digit display type that displays on a digit display using a load cell which is an electronic sensing device and a potentiometer.

The tensile strength measuring device 190 may include a load unit 191 and a control and analysis unit 199.

The load unit 191 has a table 193, a lower crosshead 194 and an upper crosshead 195 above a bed 192. The table 193 operates upward by a hydraulic cylinder, the lower crosshead 194 moves up and down along a vertical screw bar 196 that operates by a motor, and the upper crosshead 195 is lifted up along the upward movement of the table 193. A grip may be mounted on the upper and lower crossheads 194, 195 to fix the sample, and usually a sample for tensile strength testing is fixed between the upper and lower crossheads 194, 195, and a sample for compression strength or bending strength testing is fixed between the table 193 and the lower crosshead 194, and they are used for each test.

The control and analysis unit 199 may include various devices for controlling the operation of the hydraulic cylinder and the motor, and a computer device for receiving inputs of data about the load by the load unit 10 and the sample displacement, conducting an analysis using a test analysis program and displaying the analyzed data on the monitor. The tensile strength measuring device 190 is designed to test the tension, compression and bending by applying a vertical load to the sample with the upward or downward movement of the upper and lower crossheads 194, 195.

The jig assembly 185 according to an embodiment of the present disclosure may be installed between the lower crosshead 194 and the upper crosshead 195 of the tensile strength measuring device 190 shown in FIG. 5, or between the table 193 and the lower crosshead 194, to measure the bending tensile strength.

For example, as shown in FIG. 3, the present disclosure fixes the jig assembly 185 on the lower crosshead 194 of the tensile strength measuring device 190 and connects the other end part 110b of the sample 110 to the upper crosshead 195 so that the upper crosshead 195 is lifted up with the upward movement of the table 193 to pull the other end part 110b of the sample 110, measures a force at breakage, and obtains the tensile strength through calculation. Alternatively, the jig assembly 185 is fixed on the table 193 and the other end part 110b of the sample 110 is connected to the lower crosshead 194, the lower crosshead 194 pulls the other end part 110b of the sample 110 while moving up along the vertical screw bar 196, a force at breakage is measured, and the tensile strength is obtained through calculation.

The control and analysis unit 199 of the tensile strength measuring device 190 calculates the tensile strength at the point in time when the sample 110 is broken while pulling up the other end part 110b of the sample 110. In this instance, a measured value deviation caused by a force loss may be minimized by connecting the other end part 110b of the sample 110 to the tensile strength measuring device 190 with a rubber grip.

The method for measuring bending tensile strength using the apparatus 100 for measuring bending tensile strength will be sequentially described below. One end part 110a of the sample 110 is fixed through the fixing unit 150 of the jig assembly 185, and the remaining part of the sample 110 is placed under the bending jig 120 having the front end part F that is similar to the core and is lifted up toward the bending jig 120. When the sample 110 is lifted up as if the sample 110 is wound around the bending jig 120, the sample 110 is bent and disposed in contact with one surface of the bending jig 120 through the front end part F of the bottom face of the bending jig 120. Subsequently, the other end part 110b of the sample 110 is connected to the tensile strength measuring device 190. The sample 110 is pulled by the application of a vertical direction force until the point in time when the sample 110 is broken, and the tensile strength is calculated from the force at the point in time when the sample 110 is broken. Accordingly, it is possible to measure the tensile strength of the electrode in a similar condition to a winding situation. The measured tensile strength, i.e., the bending tensile strength as a new parameter may be used to identify the properties of the sample 110.

The method for measuring bending tensile strength according to the present disclosure may be used to verify the usage suitability of the electrode or the winding condition of the electrode assembly beforehand by the simulated winding situation.

For example, for simulation of a situation of the established winding condition, the cross section of the front end part F of the bottom face of the bending jig 120 is set to have a semi-circular shape with the same radius as the core radius R. Additionally, the load that the tensile strength measuring device 190 applies to the sample 110 or the speed at which the tensile strength measuring device 190 pulls the sample is set, taking the winding tension into account. When measuring the bending tensile strength under this condition, in case that the tensile strength is determined to be insufficient for winding, the electrode is determined to be unsuitable for use of an electrode assembly for winding. In this case, it is contemplated that the electrode manufacturing recipe is changed or an electrode of new specification is introduced.

The tensile strength is determined to be insufficient for winding, but if winding is carried out without a change in the electrode manufacturing recipe, i.e., using the electrode as it is, it is necessary to change the winding condition. The present disclosure is used to adjust the core radius and/or winding tension. Using a different bending jig having a front end part having dimension corresponding to the changed core radius, the bending tensile strength is measured while pulling the sample 110 at a different load and/or a different speed corresponding to the changed winding tension. The test may be repeated under varying measurement conditions until the desired level of result is obtained, to determine the finally suitable core radius and/or winding tension.

Meanwhile, in addition to the use for verification in advance, the present disclosure may be applied to identify the point in time when a crack occurs according to the bending level. The dimension adjustment of the front end part of the bending jig may provide the bending levels of various conditions, and accordingly, identify the point in time when a crack occurs.

Additionally, the present disclosure may be used to enable specification of the electrode properties. For example, it is possible to enable specification to determine the tensile strength required for an electrode suitable for manufacturing a secondary battery when measuring the bending tensile strength at a particular core radius. An electrode is produced through a standard established electrode manufacturing process, and the measuring method according to the present disclosure is performed to determine whether or not the electrode meets the specification to test the quality of the produced electrode. The electrode that is outside the specification is removed from the subsequent assembly process, and the cause why the electrode is outside the specification is investigated. For example, it is possible to identify and correct the cause by examining a line in which a variable occurred in the established manufacture process. The present disclosure may be used to enable specification and rule out the electrode that is outside the specification in the future test.

According to the present disclosure, it is possible to quantify the tensile strength and the properties of the electrode. It may be used to identify a risk that a crack occurs in the electrode before winding. It is possible to quantify the electrode properties and enable specification.

The apparatus 100 for measuring bending tensile strength has a simple structure, but its application is beyond expectations of those skilled in the art. Accordingly, the meaning of the bending tensile strength as a new parameter for electrode evaluation is special.

Meanwhile, although FIG. 3 concerning this embodiment shows the angle between the sample 110 and the bending jig 120 is 0° so that the sample 110 and the bending jig 120 are in close contact to make it similar to a situation in which the sheet-type electrode is wound in the winding-type electrode assembly when the sample 110 is connected to the tensile strength measuring device 190 such that the sample 110 having one fixed end part 110a comes into contact with one surface of the bending jig 120 through the bottom face of the bending jig 120, this angle may change depending on the implementation method and arrangement of the fixing unit 150 and the bending jig 120. It will be described in more detail in the next embodiment.

Figure 6:
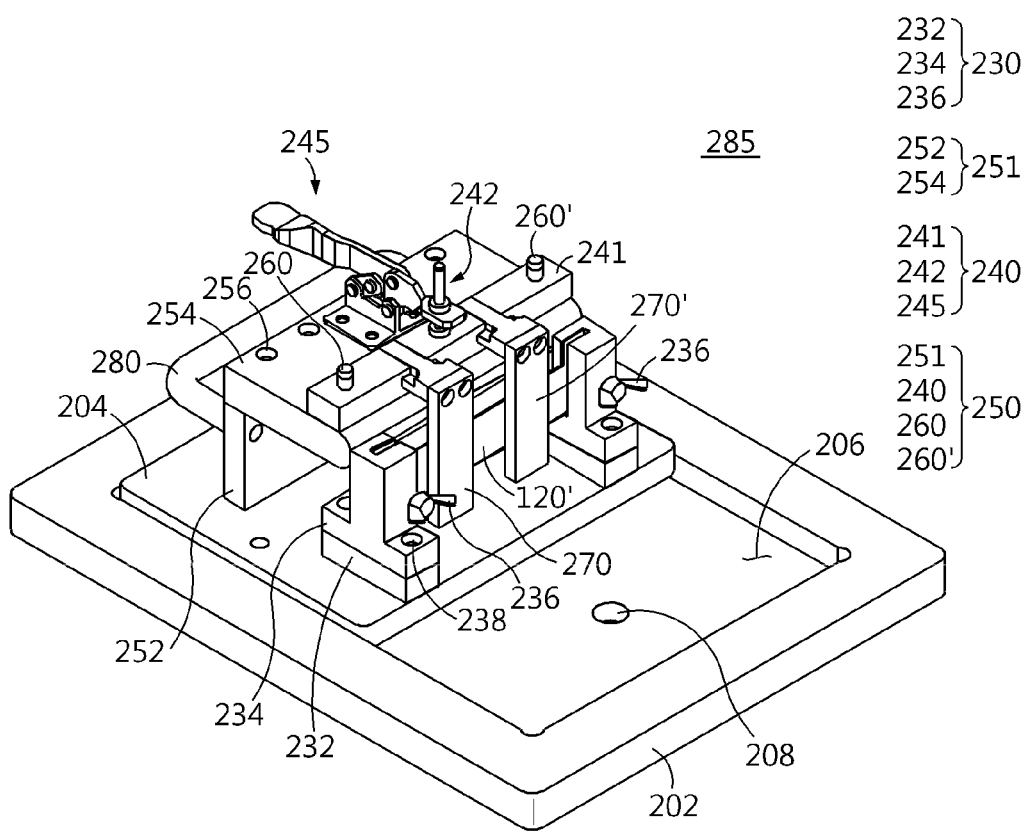
FIG. 6 is a perspective view of a jig assembly according to another embodiment of the present disclosure.
Figure 7:
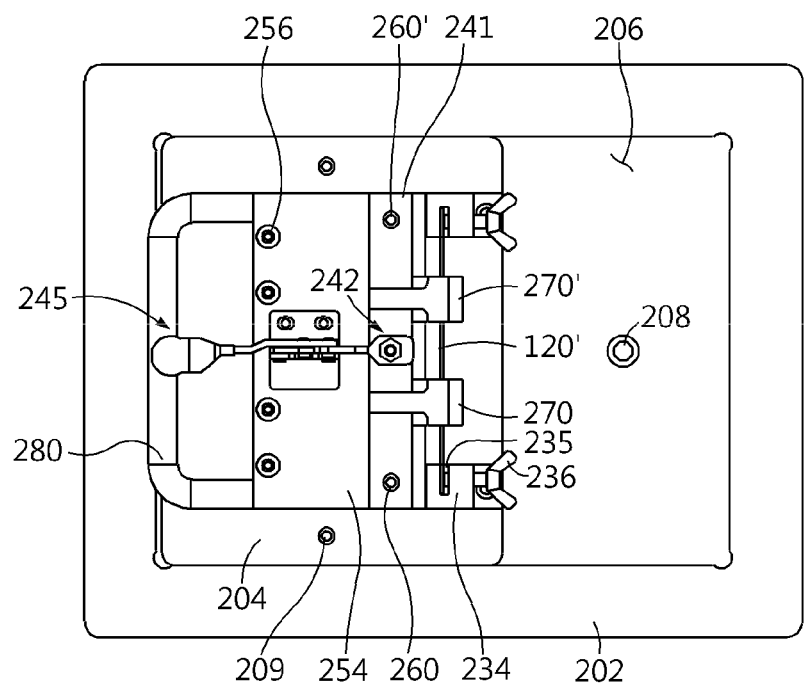
FIG. 7 is a top view of the jig assembly of FIG. 6.
Figure 8:
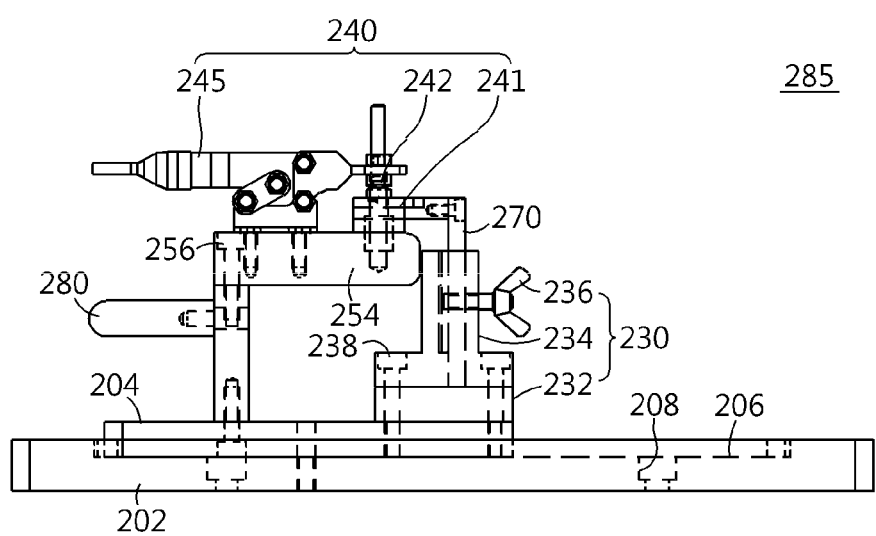
FIG. 8 is a side view of the jig assembly of FIG. 6.

There are a variety of embodiments of the jig assembly of the present disclosure and the apparatus for measuring bending tensile strength using the same on the basis that it is implemented to measure the tensile strength of the sample when the sample is bent, and for example, a type of jig assembly shown in FIGS. 6 to 8 is also contemplated. FIG. 6 is a perspective view of a jig assembly according to another embodiment of the present disclosure, FIG. 7 is a top view, and FIG. 8 is a side view.

The jig assembly 285 includes a bending jig 120' that is almost similar to the bending jig 120 of the jig assembly 185 in the apparatus 100 for measuring bending tensile strength described above. Only the upper surface of the bending jig 120' was structurally modified, considering the structural relationship with other member for fixing the bending jig 120'. The fixing unit 150 of the jig assembly 185 was modified to a fixing unit 250. A new apparatus (200 in FIG. 11 as described below) for measuring bending tensile strength may be implemented by using the jig assembly 285 together with the tensile strength measuring device 190 of the apparatus 100 for measuring bending tensile strength as it is, or further including its similar tensile strength measuring device.

The jig assembly 285 includes a bottom fixing die 202. The bottom fixing die 202 is in the shape of an approximately rectangular plate and has a groove 206 in which a bottom plate 204 is received, and a fixing hole 208 on the bottom of the groove 206. A hexagon socket head bolt 209 may be used to fix the bottom fixing die 202 and the bottom plate 204. The inclusion of the bottom fixing die 202 firmly fixes the jig assembly 285 to a workstation such as the table 193 or the lower crosshead 194 of the tensile strength measuring device 190 as shown in FIG. 5, to determine the stable location of the jig assembly 285 even in many repetitions.

The bottom plate 204 is a basis where the mechanical structure of the jig is substantially implemented. The bottom plate 204 has a support 230. The support 230 fixes the bending jig 120' on two ends of the bending jig 120'. The bending jig 120' is fixed by the support 230 positioned on two sides, and is designed such that the bottom face of the bending jig 120' does not touch the bottom plate 204. That is, the sample is installed at a location at which the sample passes through the bottom face of the bending jig 120' and does not generate any unnecessary friction.

The method whereby the support 230 fixes the bending jig 120' is not particularly limited. In an embodiment, the support 230 may include a block 232 that is installed in the bottom plate 204, a jig fixing block 234 that is installed on the block 232, and a wing bolt 236 for fixing the bending jig 120' after the bending jig 120' is mounted in the jig fixing block 234. A hexagon socket head bolt 238 may be used to fix the block 232 and the jig fixing block 234. A pair of blocks 232, a pair of jig fixing blocks 234 and a pair of wing bolts 236 are provided to support the bending jig 120' on two sides. A slot 235 is formed on the upper surface of the jig fixing block 234, and the bending jig 120' may be inserted into the slot 235. After the bending jig 120' is inserted into the slot 235, the bending jig 120' may be firmly fixed to the inner surface of the slot 235 by tightening the wing bolt 236.

A base 251 is designed to fix one end part of the sample, and is provided on the opposite side to the support 230 on the bottom plate 204, and there is no particular limitation in terms of material. However, to prevent an unnecessary force from being applied to the sample due to the corners of the base 251, the corner of the base 251 that touches the sample is preferably rounded. The base 251 is a member on which one end part of the sample is placed such that one end part of the sample is disposed higher than the bottom face of the bending jig 120'.

The base 251 may include a vertical fixing block 252 that stands upright from the bottom plate 204 and a horizontal fixing block 254 connected and fixed thereto at a right angle toward the bending jig 120'. A hexagon socket head bolt 256 may be used to fix the vertical fixing block 252 and the horizontal fixing block 254. The height is adjusted such that one end part of the sample is placed on the horizontal fixing block 254 and one end part of the sample is disposed higher than the bottom face of the bending jig 120'.

A fixing plate 240 fixes one end part of the sample to the base 251. The fixing plate 240 basically includes a clamp block 241 to directly press one end part of the sample, and may include a toggle clamp 245 to apply a force thereto. The toggle clamp 245 is a tool that acts as a large force by application of a small force to fix the clamp block 241. Additionally, a connecting part 242 is formed between the clamp block 241 and the toggle clamp 245. The connecting part 242 may include a clamp pin, a spring, and an E-type snap ring. The E-type snap ring is a fastener that is opened by an applied force for use, and fixes by snug fit.

Screws 260, 260' are provided on two sides of the clamp block 241 of the fixing plate 240, and before one end part of the sample is placed on the base 251, the clamp block 241 of the fixing plate 240 is spaced apart from the base 251 by lifting up the toggle clamp 245 lever. Subsequently, after one end part of the sample is placed on the base 251, the clamp block 241 of the fixing plate 240 is placed on one end part of the sample by lifting down the toggle clamp 245 lever, and then the screws 260, 260' on two sides of the fixing plate 240 are adjusted to move the clamp block 241 of the fixing plate 240 further down so that one end part of the sample is pressed, and one end part of the sample does not move and is fixed between the base 251 and the clamp block 241 of the fixing plate 240. The base 251, the fixing plate 240 and the screws 260, 260' are the fixing unit 250 of this embodiment corresponding to the fixing unit 150 described in the previous embodiment.

Preferably, the jig assembly 285 may further include sample location center setting jigs 270, 270' that are disposed in the fixing plate 240 to set the center location of the sample. When the thickness of the sample is small on micrometer level, the sample is so susceptible to bend that it sags by its self-load, and it may be difficult to determine the location. Additionally, to always maintain the same test condition in repeated experiments, a uniform sample fixing location is necessary. To this end, the present disclosure has the sample location center setting jigs 270, 270'. When the sample is disposed between the sample location center setting jigs 270, 270', the center location of the sample is always uniformly maintained.

The jig assembly 285 may further include a handle 280 to facilitate the movement. For example, the handle 280 may be provided in the base 251. In particular, this embodiment shows an example in which the handle 280 is provided in the vertical fixing block 252.

The method for measuring bending tensile strength using the jig assembly 285 together with the tensile strength measuring device 190 is not so different from the method using the apparatus 100 for measuring bending tensile strength described above, and the use of the jig assembly 285 will be described in more detail below with reference to FIGS. 9 to 12.

Figure 9:
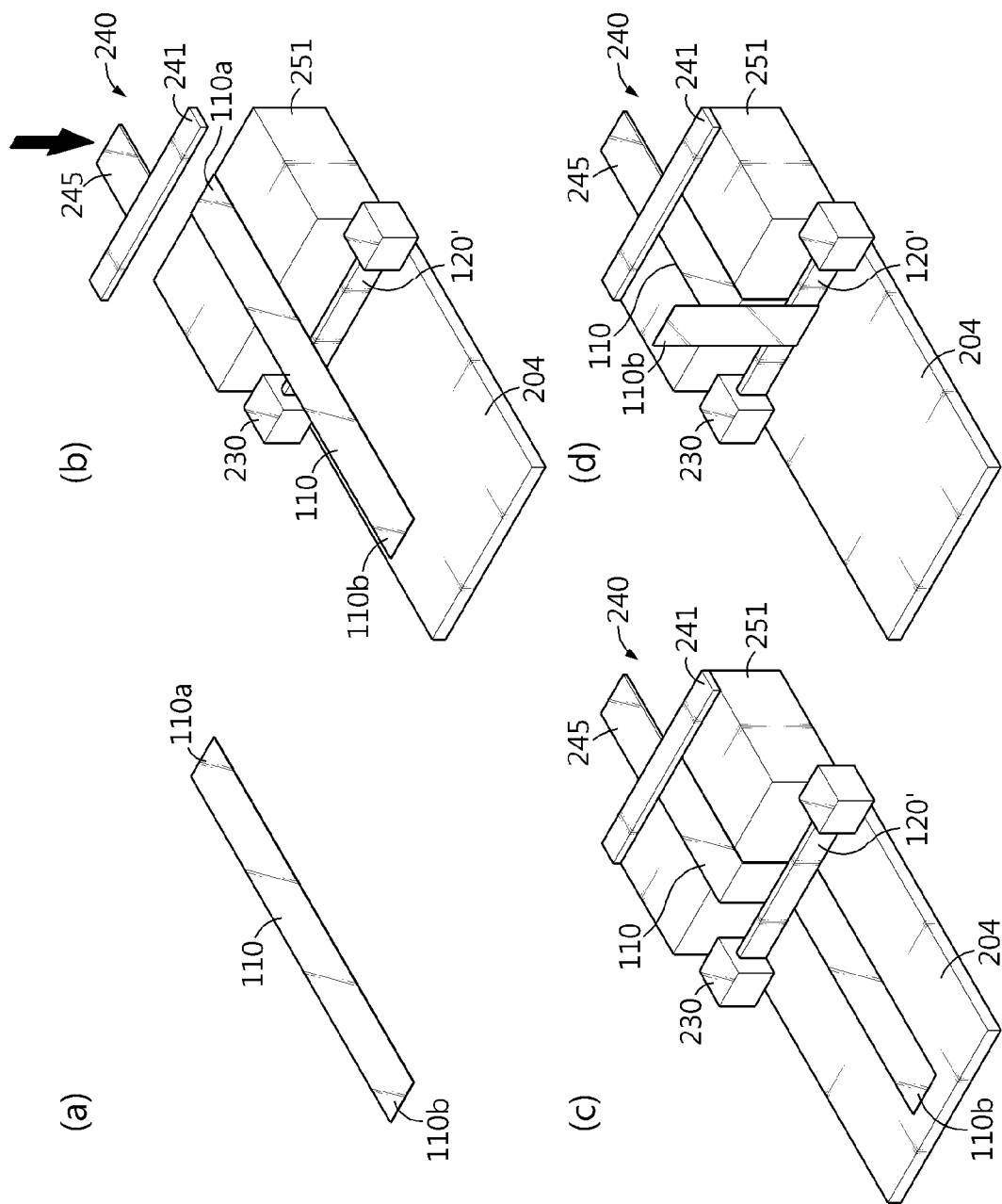
FIG. 9 is a schematic diagram of each step of a method for measuring bending tensile strength using the jig assembly of FIG. 6.
Figure 10:
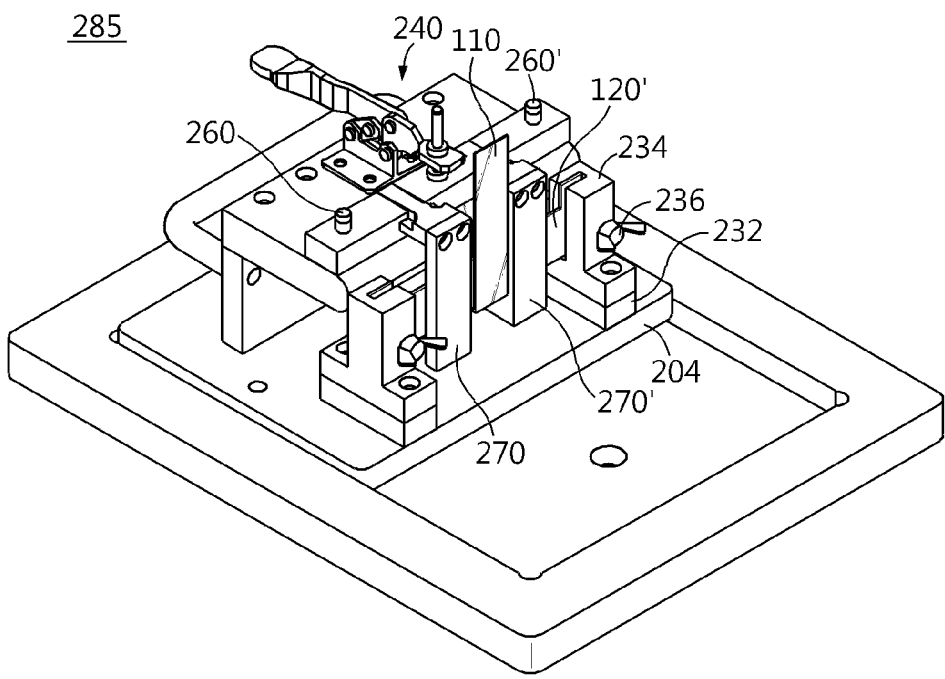
FIGS. 10 and 11 are perspective views after setting an electrode sample in the jig assembly of FIG. 6.
Figure 11:
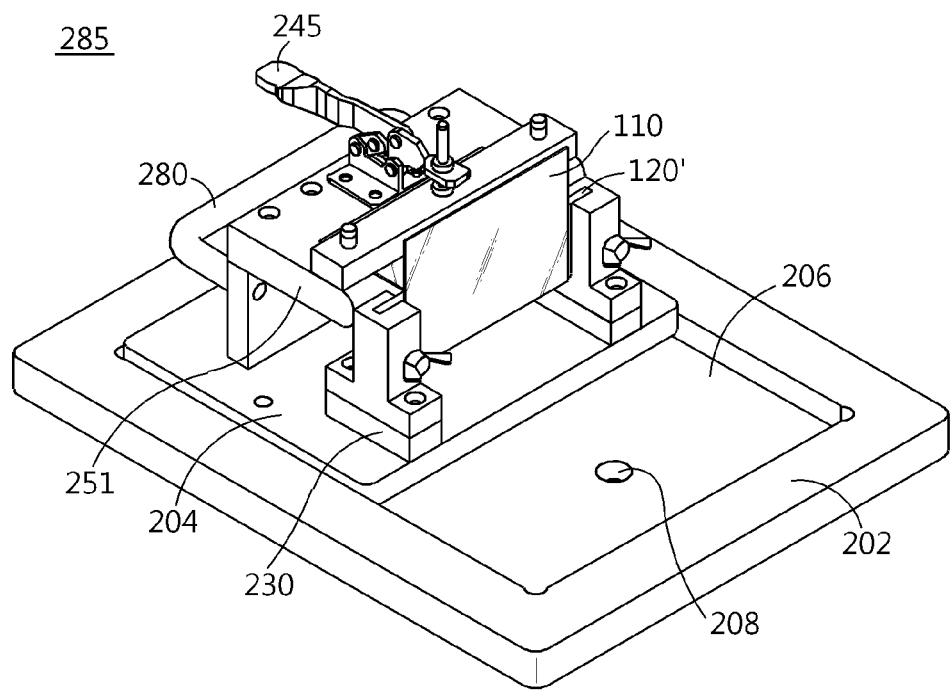
Figure 12:
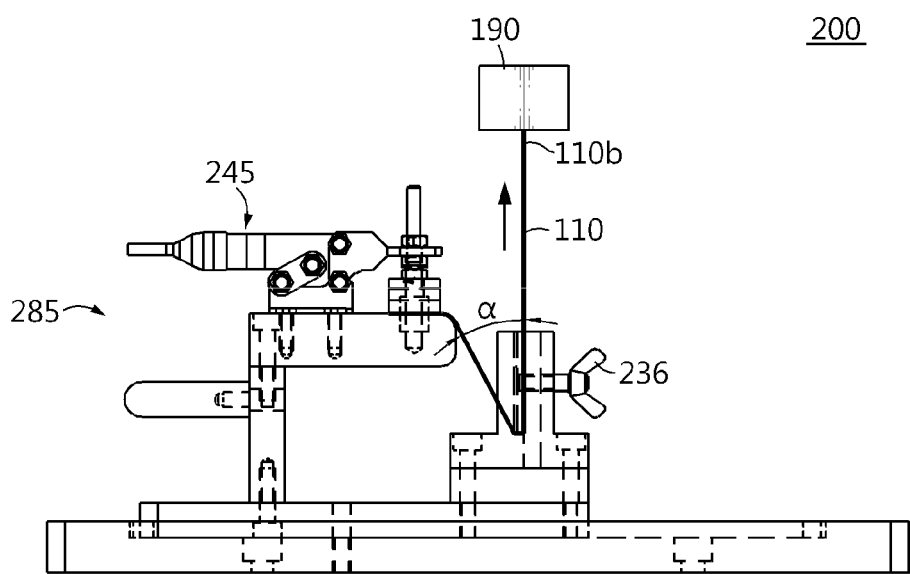
FIG. 12 is a side view of FIG. 11, schematically showing the jig assembly of FIG. 6 and the apparatus for measuring bending tensile strength including the same.

FIG. 9 is a schematic diagram of each step of the method for measuring bending tensile strength using the jig assembly of FIG. 6. FIGS. 10 and 11 are perspective views after setting the electrode sample in the jig assembly of FIG. 6. FIG. 12 is a side view of FIG. 11, schematically showing the jig assembly of FIG. 6 and the apparatus for measuring bending tensile strength including the same.

First, as shown in (a) of FIG. 9, the sample 110 having one end part 110a and the other end part 110b is prepared. Subsequently, as shown in (b), one end part 110a of the sample 110 is fixed between the base 251 and the fixing plate 240 of the jig assembly 285. When the toggle clamp 245 lever is lifted up, the clamp block 241 moves up. When one end part 110a of the sample 110 is placed on the base 251 and the toggle clamp 245 lever is lifted down, the clamp block 241 moves down and one end part 110a of the sample 110 is fixed. Subsequently, as shown in (c), the sample 110 is placed under the bending jig 120'. Subsequently, as shown in (d), the sample 110 is placed in contact with one surface of the bending jig 120' through the bottom face of the bending jig 120', and the other end part 110b of the sample 110 is connected to the tensile strength measuring device (see 190 in FIGS. 5 and 12). The sample 110 is lifted up as if it is wound on the bending jig 120', and is connected to the tensile strength measuring device 190.

FIGS. 10 and 11 show that the settings of the sample 110 are completed. Although each member is shown in brief and the sample location center setting jigs 270, 270' are omitted in (b) to (d) of FIG. 9 for convenience of illustration, the sample location center setting jigs 270, 270' are disposed and the sample 110 is set therebetween as shown in FIG. 10. Meanwhile, even in case that the sample 110 is wide as shown in FIG. 11, setting may be performed using the method shown in FIG. 9.

Subsequently, as shown in FIG. 12, a force is applied to the sample 110 by holding the other end part 110b of the sample 110 using the tensile strength measuring device 190 until the point in time when the sample 110 is broken, and the electrode properties are identified by measuring the tensile strength.

As described above, the upper surface of the horizontal fixing block 254 of the base 251 is disposed higher than the bottom face of the bending jig 120'. Accordingly, as shown in FIG. 12 in detail, when the sample 110 is connected to the tensile strength measuring device 190 such that the sample 110 having one end part 110a fixed between the base 251 and the fixing plate 240 comes into contact with one surface of the bending jig 120' through the bottom face of the bending jig 120', a uniform angle (a) is formed between the sample 110 running down from the base 251 and one surface of the bending jig 120'. The angle is most preferably 0° as taken as an example in the previous embodiment and on the basis of theory, but when considering the allowable error range and costs, the angle is preferably in the range between 0 and 10°. When the angle is larger than 10°, it is impossible to obtain an accurately measured value.

Hereinafter, the present disclosure will be described in more detail by the experimental example.

Experimental Example

A positive electrode active material slurry was prepared by mixing $LiCoO_2$ as a positive electrode active material, carbon black as a conductive material, PVdF as a binder and $Li_2Co_2$ as an additive at a weight ratio of 97.2:0.9:1.5:0.4 and adding them to N-methyl-2-pyrrolidone (NMP). The prepared slurry was coated on one surface of an aluminum foil, dried and press-rolled to prepare a first electrode. An excessive force was applied to the first electrode, intentionally causing a crack, to prepare a second electrode.

For example, when the coating thickness of the positive electrode active material slurry is 200 um, the first and second electrodes may be prepared by press-rolling such that the first electrode is 150 um thick and by applying a larger force such that the second electrode is 140 um thick.

Samples were manufactured by punching the first electrode and the second electrode into a predetermined size using a tensile test sample punch. Center sample 1 was punched from the center part of the first electrode, with eight punches of 20 mm×100 mm in size. Side sample 1 was punched from the edge part of the first electrode, with eight punches of 20 mm×100 mm in size. Center sample 2 was punched from the center part of the second electrode, with eight punches of 20 mm×100 mm in size. Side sample 2 was punched from the edge part of the second electrode, with eight punches of 20 mm×100 mm in size.

The bending tensile strength of the samples was measured using the apparatus 200 for measuring bending tensile strength of the present disclosure. The diameter of the front end part F of the bending jig 120' was set to 0.96 mm. It is 0.48 mm when indicated in radius, and this is a value in the radius range condition between 0.25 and 0.5 mm. INSTRON UTM machine was used for the tensile strength measuring device 190, and after the sample is mounted on the UTM machine, a force applied when pulling under the condition of Tension Annealing (TA): speed 50 mm/min was measured, and thus the force at breakage was measured and obtained through calculation. The angle α between the sample running down from the base 251 and one surface of the bending jig 120' was set to 5°. This is a value in the range condition between 0 and 10°.

Hereinafter, the present disclosure will be described by the experimental example in more detail.

Figure 13:
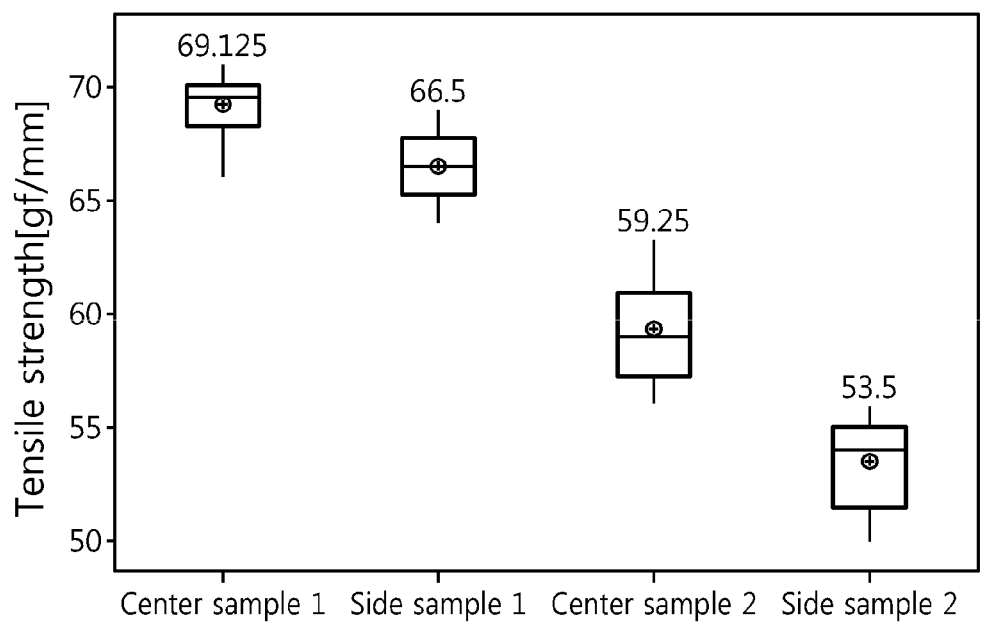
FIG. 13 is a graph showing the bending tensile strength measurement results according to experimental example.

The measured results were obtained as shown in Table 1 and the graph of FIG. 13. The values in Table 1 indicate the tensile strength (gf/mm), and averages of eight samples were calculated and are shown in FIG. 13.

TABLE 1

|  | Center sample 1 | Side sample 1 | Center sample 2 | Side sample 2 |
|---|---|---|---|---|
| Average | 69.1 | 66.5 | 59.3 | 53.5 |
| 1 | 70 | 67 | 57 | 50 |
| 2 | 71 | 66 | 58 | 51 |
| 3 | 69 | 67 | 60 | 55 |
| 4 | 68 | 64 | 56 | 54 |
| 5 | 66 | 68 | 58 | 54 |
| 6 | 69 | 65 | 61 | 53 |
| 7 | 70 | 69 | 63 | 56 |
| 8 | 70 | 66 | 61 | 55 |

Referring to Table 1 and FIG. 13, the tensile strength of Center sample 2 and Side sample 2 obtained from the second electrode in which cracks intentionally occurred were measured as being lower by 16 to 24% than that of Center sample 1 and Side sample 1 obtained from the normal first electrode in which cracks did not occur. The normal first electrode is an electrode that meets the specification, and the cracked second electrode is an electrode that is outside the specification. The result reveals that the bending tensile strength measuring device according to the present disclosure can significantly distinguish the two electrodes.

Meanwhile, the tensile strength of the side samples was measured as being lower than that of the center samples. Because the edges of the electrode are more subjected to a force by rollers than the middle of the electrode when press-rolling, the edges are weaker than the middle. The result shows that the apparatus for measuring bending tensile strength according to the present disclosure can significantly distinguish this difference.

With the specification criteria, this experimental result may be used to sort out a faulty electrode in which a crack will be likely to occur in advance. Referring to the above experimental results, an arbitrary tensile strength corresponding to a value between the tensile strength of the intentionally cracked second electrode and the tensile strength of the normal first electrode may be set as specification. For example, 65 gf/mm may be set as specification. When testing the electrode in the future, if the tensile strength of an electrode is equal to or larger than 65 gf/mm, the electrode is determined to be normal. When the tensile strength of the electrode is less than 65 gf/mm, there is a likelihood that a crack will occur in a real winding process and the electrode is determined to be faulty.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A jig assembly comprising:
   a fixing unit configured to fix a first end part of a sample;
   a plate shaped bending jig configured to provide a one point bend on a lengthwise direction cross section of the sample and to guide a second end part of the sample toward a tensile testing load unit;
   a support spaced from and separate from the fixing unit, the support being configured to fix the bending jig at two ends of the bending jig.

2. The jig assembly according to claim 1, wherein the bending jig has a flat rectangular parallelepiped shape having a bottom face and a front end part in a shape of a semi-sphere or a semi-polygonal prism, the bottom face and the front part being configured to provide the one point bend.

3. The jig assembly according to claim 2, wherein the front part has a predetermined radius or cross-section.

4. The jig assembly according to claim 3, wherein the cross section of the front end part has a semi-circular shape with the radius of 0.25 to 0.5 mm.

5. The jig assembly according to claim 2,
   wherein the fixing unit comprises:
   a base configured to support the first end part of the sample such that the first end part of the sample is disposed higher than the bottom face of the bending jig; and
   a fixing plate configured to fix the first end part of the sample to the base.

6. The jig assembly according to claim 5, wherein the bending jig is located relative to the base such that an angle between the sample extending from the base to the bending jig is from 0 to 10°.

7. The jig assembly according to claim 5, further comprising:
   a sample location center setting jig which is disposed in the fixing plate to set a center location of the sample.

8. The jig assembly according to claim 5, further comprising:
   a bottom plate coupled to the support and the base,
   wherein the support comprises:
   a block installed at the bottom plate;

a jig fixing block installed at the block and having a slot into which the bending jig is inserted on an upper surface of the jig fixing block; and a wing bolt to fix the bending jig mounted in the jig fixing block.

9. The jig assembly according to claim 5, further comprising:

a bottom plate coupled to the support and the base, wherein the base and support are provided on opposite ends of the bottom plate, and the base comprises:

a vertical fixing block standing upright from the bottom plate; and a horizontal fixing block connected and fixed to the vertical fixing block at a right angle to extend toward the bending jig such that the first end part of the sample is placeable on the horizontal fixing block.

10. The jig assembly according to claim 5, wherein the fixing plate comprises:

a clamp block configured to directly press the first end part of the sample against the base; and a toggle clamp configured to apply a force to the clamp block.

11. The jig assembly according to claim 10, further comprising:

a screw configured to move the clamp block towards the base to press the first end part of the sample so that the first end part of the sample is fixable between the base and the clamp block to prevent the first end part of the sample from moving.

12. An apparatus for measuring bending tensile strength, comprising:

a fixing unit configured to fix a first end part of a sample;

a plate shaped bending jig configured to provide a one point bend on a lengthwise direction cross section of the sample and to guide a second end part of the sample toward a tensile testing load unit; and a tensile strength measuring device configured to be connectable to the second end part of the sample such that the second end part of the sample passes around the bottom face of the bending jig of the jig assembly, the tensile strength measuring device including a tensile testing load unit arranged in a vertical direction, in order to measure a tensile strength while bending the sample.

13. The apparatus for measuring bending tensile strength according to claim 12, wherein the tensile testing load unit of the tensile strength measuring device includes a table, a lower crosshead, and an upper crosshead above a bed, wherein the table is movable up and down by a hydraulic cylinder, the lower crosshead is movable up and down along a vertical screw bar that is operated by a motor, and the upper crosshead is movable up and down with the movement of the table, and wherein the jig assembly is installed between the lower crosshead and the upper crosshead or between the table and the lower crosshead.

14. A method for measuring bending tensile strength using the apparatus for measuring bending tensile strength defined in claim 12, the method comprising:

fixing a first end part of a sample using the fixing unit of the jig assembly;

placing the sample under the bending jig and bending up the sample while being wound on the bending jig;

connecting a second end part of the sample to the tensile strength measuring device; and applying a force to the second end part of the sample and calculating the tensile strength from a force at a point in time when the sample is broken.

15. The jig assembly according to claim 1, further comprising:

a bottom plate coupled to the support and the fixing unit, wherein the fixing unit and support are provided on opposite ends of the bottom plate.

* * * * *